US012259237B2

(12) United States Patent
Cranford

(10) Patent No.: US 12,259,237 B2
(45) Date of Patent: Mar. 25, 2025

(54) DEPTH GAUGE AND TUBE SIZE IDENTIFICATION TOOL AND METHOD OF USING THE SAME

(71) Applicant: Applied System Technologies, Inc., Charlotte, NC (US)

(72) Inventor: Seth S. Cranford, Matthews, NC (US)

(73) Assignee: Applied System Technologies, Inc., Charlotte, NC (US)

( * ) Notice: Subject to any disclaimer, the term of this patent is extended or adjusted under 35 U.S.C. 154(b) by 350 days.

(21) Appl. No.: 17/873,415

(22) Filed: Jul. 26, 2022

(65) Prior Publication Data

US 2024/0035798 A1    Feb. 1, 2024

(51) Int. Cl.
*G01B 5/02*    (2006.01)

(52) U.S. Cl.
CPC .................................. *G01B 5/025* (2013.01)

(58) Field of Classification Search
CPC ............. G01B 5/025; G01B 5/08; G01B 3/14
See application file for complete search history.

(56) References Cited

U.S. PATENT DOCUMENTS

| 2,896,333 | A | | 7/1959 | Kivela | |
|---|---|---|---|---|---|
| 2,981,005 | A | | 4/1961 | Walter | |
| 3,041,735 | A | * | 7/1962 | Allen | G01B 3/30 33/517 |
| 4,107,850 | A | * | 8/1978 | Adler | G01B 3/38 33/542 |
| 4,177,570 | A | | 12/1979 | Hewitt | |

(Continued)

FOREIGN PATENT DOCUMENTS

| CA | 2730436 | A1 | 8/2011 |
|---|---|---|---|
| GB | 650588 | A | 2/1951 |

OTHER PUBLICATIONS

Tru-Sonic; 6-Step Internal Step Block-Metric; Dec. 8, 2020; p. 2, https://ndtsupply.com/tru-sonic-6-step-internal-step-block-metric.html.

(Continued)

*Primary Examiner* — Yaritza Guadalupe-McCall
(74) *Attorney, Agent, or Firm* — Seth L. Hudson; Maynard Nexsen PC

(57) ABSTRACT

A depth gauge and tube size identification tool that includes a housing that includes a first opposed side portion, a second opposed side portion, a top portion, and a bottom portion. An open face disposed within the housing and positioned between the first opposed side portion, the second opposed side portion, and the top portion. Two or more curved elements are disposed within the open face having a curved face portion with a radius of curvature that corresponds with the outside diameter of a tube intended to be inserted into the at least one curved element for identifying the tube size. At least one of the curved elements contains a curved face portion and a first shoulder extends from a distal portion of the curved face portion and a second shoulder extends from another distal portion of the curved face portion, the curved face portion, the first shoulder, and the second shoulder contain a radius of curvature that corresponds with the outside diameter of a tube intended to be inserted into the at least one curved element for identifying the tube size.

12 Claims, 4 Drawing Sheets

(56) References Cited

U.S. PATENT DOCUMENTS

| | | | | |
|---|---|---|---|---|
| 4,219,937 | A * | 9/1980 | Lorenzini | G01B 5/18 |
| | | | | 33/544.3 |
| 5,042,161 | A * | 8/1991 | Hodge | A61F 2/06 |
| | | | | D10/64 |
| 5,199,180 | A * | 4/1993 | Yablonsky | G01B 3/30 |
| | | | | D10/64 |
| 5,459,936 | A * | 10/1995 | Stange | G01B 3/38 |
| | | | | 33/529 |
| 5,604,989 | A * | 2/1997 | Stevenson | G01B 3/46 |
| | | | | 33/506 |
| 5,685,085 | A | 11/1997 | Bond | |
| D411,808 | S * | 7/1999 | Irwin | D10/65 |
| 6,438,859 | B1 * | 8/2002 | Lynch | G01B 3/30 |
| | | | | 33/542 |
| 6,901,672 | B1 * | 6/2005 | Reilly | G01B 3/30 |
| | | | | 33/501.45 |
| 6,904,690 | B2 | 6/2005 | Bakke et al. | |
| 7,861,429 | B2 * | 1/2011 | Lee | G01B 3/42 |
| | | | | 33/832 |
| 8,875,411 | B2 * | 11/2014 | Al-Dhafiri | G01B 3/08 |
| | | | | 33/529 |
| 9,625,246 | B2 * | 4/2017 | Rodriguez | G01B 3/34 |
| 9,863,748 | B2 * | 1/2018 | Sheridan | G01B 5/0023 |
| 10,046,456 | B2 * | 8/2018 | Byrt | B25H 7/005 |
| 10,612,902 | B2 * | 4/2020 | Granville | G01B 3/04 |
| 11,009,333 | B1 * | 5/2021 | Zamora | G01B 3/56 |
| 11,486,688 | B1 * | 11/2022 | Capo | G01C 9/32 |
| 11,525,659 | B2 * | 12/2022 | Crockett | B25H 7/00 |
| D996,992 | S * | 8/2023 | Capo | D10/64 |
| 11,949,215 | B2 * | 4/2024 | Horgan | G01B 3/30 |
| 2005/0235505 | A1 | 10/2005 | Joseph | |
| 2013/0125407 | A1 * | 5/2013 | Shapiro | G01B 3/04 |
| | | | | 33/484 |
| 2014/0182151 | A1 * | 7/2014 | Li | A61B 5/107 |
| | | | | 33/512 |
| 2015/0033570 | A1 | 2/2015 | Bernabe | |
| 2017/0052009 | A1 * | 2/2017 | Sheridan | F42B 35/02 |
| 2018/0266804 | A1 * | 9/2018 | Granville | G01B 3/04 |
| 2020/0182598 | A1 | 6/2020 | Lowitz | |
| 2024/0035798 | A1 * | 2/2024 | Cranford | G01B 5/08 |
| 2024/0204496 | A1 * | 6/2024 | Horgan | H02G 1/1212 |

OTHER PUBLICATIONS

ERVW®; Pipe Cal Blocks (Circ Scan, SDHs); Dec. 8, 2020, pp. 1-2; https://store.phtool.com/asme-compliant-ervw-line-of-calibration-blocks/ervw-pipe-cal-blocks-circ-scan-sdhs/ervw-pipe-cal-blocks-circ-scan-sdhs/.

Ray-Check Manufacturing Inc.; Ultrasonic Products, Dec. 8, 2020, p. 5, http://www.ray-check.com/ultrasonic.php.

\* cited by examiner

DEPTH GAUGE AND TUBE SIZE IDENTIFICATION TOOL AND METHOD OF USING THE SAME

FIELD OF THE INVENTION

The present invention relates generally to a depth gauge and tube size identification tool and more generally relates to a tool that accurately measures the outside diameter of a tube, such as a pipe, and measures and identifies the depth for correctly inserting the tube into a fitting for secured and complete connection.

BACKGROUND OF THE INVENTION

The present invention relates to an improved depth gauge and tube size identification tool and methods of using the same. Specifically, the present inventions relate to an improved depth gauge and tube size identification tool and methods of using the same for allowing a user to use a single tool for quickly and accurately identifying the size of various sizes of tubes and gauge the depth of various sizes of tubes. In order to determine the size of a tube, a user may measure the tube with tape, string, or the like, and once the measurement is read, the user can cross-reference with the measurement obtained to a chart to determine the size of the tube.

U.S. Pat. No. 6,904,690 discloses a pipe size identifier and measuring tool discloses a plurality of gauges that are pivotally connected to each other. Each gauge has an open mouth that is different from each other, a front end, a body portion, and a rear end. The rear end of each gauge is pivotally mounted together. The front ends are wider than the rear ends and contain indicia on the gauge that identifies the pipe measured.

BRIEF SUMMARY OF THE INVENTION

According to an embodiment of the present invention, a depth gauge and tube size identification tool that includes a housing including an open face, at least one curved element disposed within the open face having a curved face portion with a radius of curvature that corresponds with the outside diameter of a tube intended to be inserted into the at least one curved element for identifying the tube size.

According to yet another embodiment of the present invention, a depth gauge and tube size identification tool that includes a housing that includes a first opposed side portion, a second opposed side portion, a top portion, and a bottom portion. An open face disposed within the housing and positioned between the first opposed side portion, the second opposed side portion, and the top portion. Two or more curved elements are disposed within the open face having a curved face portion with a radius of curvature that corresponds with the outside diameter of a tube intended to be inserted into the at least one curved element for identifying the tube size. At least one of the curved elements contains a curved face portion and a first shoulder extends from a distal portion of the curved face portion and a second shoulder extends from another distal portion of the curved face portion, the curved face portion, the first shoulder, and the second shoulder contain a radius of curvature that corresponds with the outside diameter of a tube intended to be inserted into the at least one curved element for identifying the tube size.

According to yet another embodiment of the present invention, a method of gauging the depth and identifying the size of a tube that includes providing a housing including an open face and at least one curved element disposed within the open face having a curved face portion with a predetermined radius of curvature. A tube is placed within the at least one curved element for identifying the size of the tube that corresponds to the radius of the at least one curved element.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
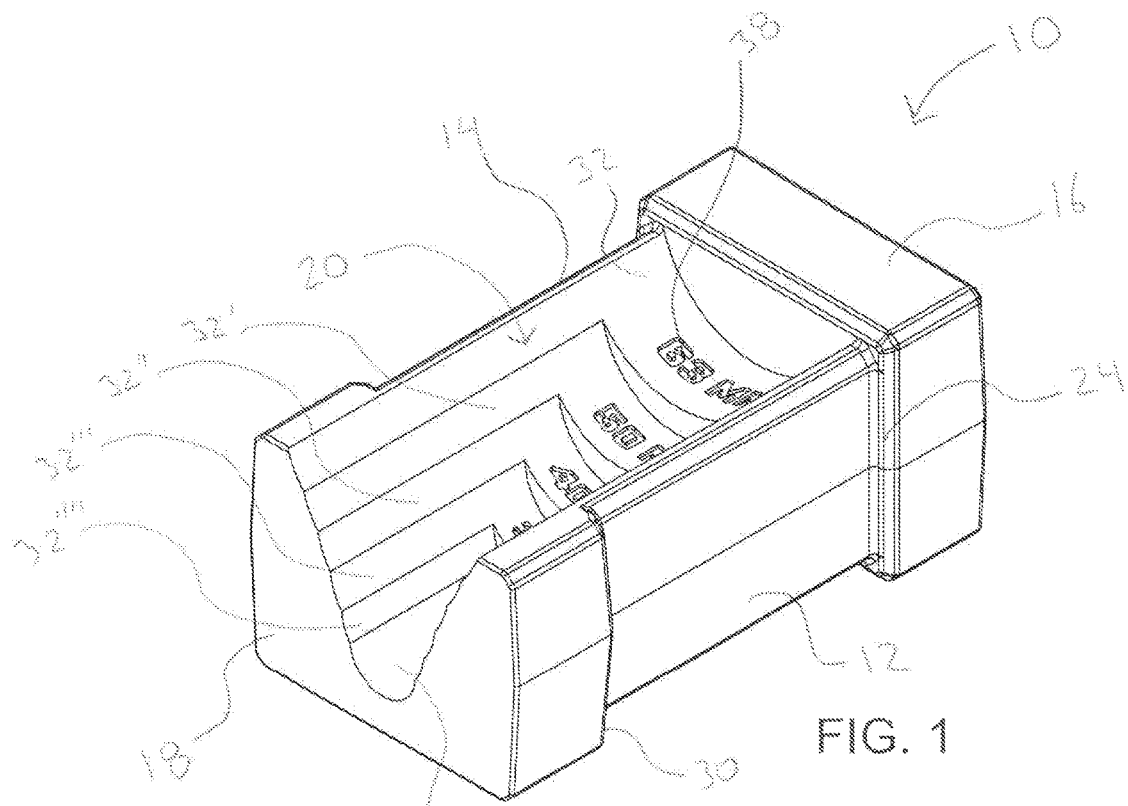
FIG. 1 is a top perspective view of the depth gauge and tube size identification tool.

Referring now specifically to the drawings, a depth gauge and tube size identification tool is illustrated in FIG. 1 and is shown generally at reference numeral 10. The tool 10 includes a housing that has two pairs of opposed side portions—a first opposed side portion 12 and a second opposed side portion 14, a top portion 16, a bottom portion 18, an open face 20, and a back portion 22. The open face is contained within the first opposed side portion 12, the second opposed side portion 14, the top portion 16, and the bottom portion 18. The overall shape of the tool 10 is generally a rectangular prism.

The top portion 16 is located on one end of the tool 10 and serves as the uppermost end of the open face 20. The bottom portion 18 is located on the opposite end of the tool 10 and contains a substantially v-shaped portion for allowing tubes to be inserted into the open face 20. The top portion 16 has a width greater than the width between each side portion. In other words, the top portion 16 extends outward from the first opposed side portion 12, the second opposed side portion 14, and the back portion 22, forming a ledge 24, and extends upwardly from the ledge 24 to an upper edge. As illustrated, the ledge 24 may be chamfered. The top portion 16 is composed of two pairs of opposed side portions that intersect, defining corners. The corners are preferably not sharp corners, but rounded, so that there is no sharp edge or substantially 90° angle formed at the point of intersection between each side portion. An upper portion extends from the upper edge of the top portion 16 towards a central location of the top portion 16 forming an outer edge of a cavity 26 centrally located within the top portion 16. The cavity 26 is generally rectangularly shaped and has two pairs of opposed edges that intersection. A handle 28 is engaged to the top portion 16 and is suspended either over the cavity 26, partially suspended within the cavity 26, or positioned within the cavity 26. The handle 28 has a first end and a second end. The first end of the handle 28 is engaged to one side of the upper portion and the second end of the handle 28 is engaged to an opposite side of the upper portion. Alternatively, the first end of the handle 28 is engaged to an edge of the cavity 26 and the second end of the handle 28 is engaged to an opposite edge of the cavity 26, allowing the handle 28 to span the length of the cavity 26. The handle 28 allows the tool 10 to be carried easily and attached to a user, such as a user's belt, or other structure, such as a work lift, for allowing a user to easily access the tool 10 and store the tool 10. The cavity 26 spans the entire area under the handle 28 allowing a device, such as a carabineer or the like, to encircle the handle 28, or a user's handle to encircle the handle 28.

Figure 2:
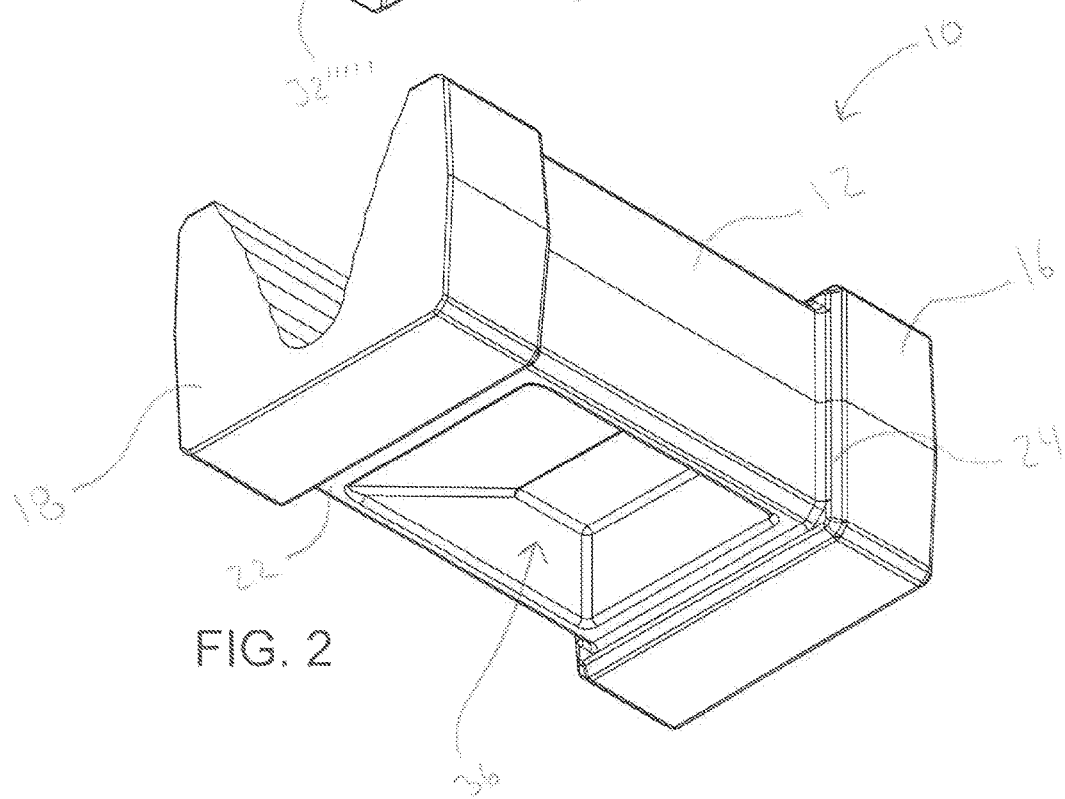
FIG. 2 is a bottom perspective view of the depth gauge and tube size identification tool.
Figure 3:
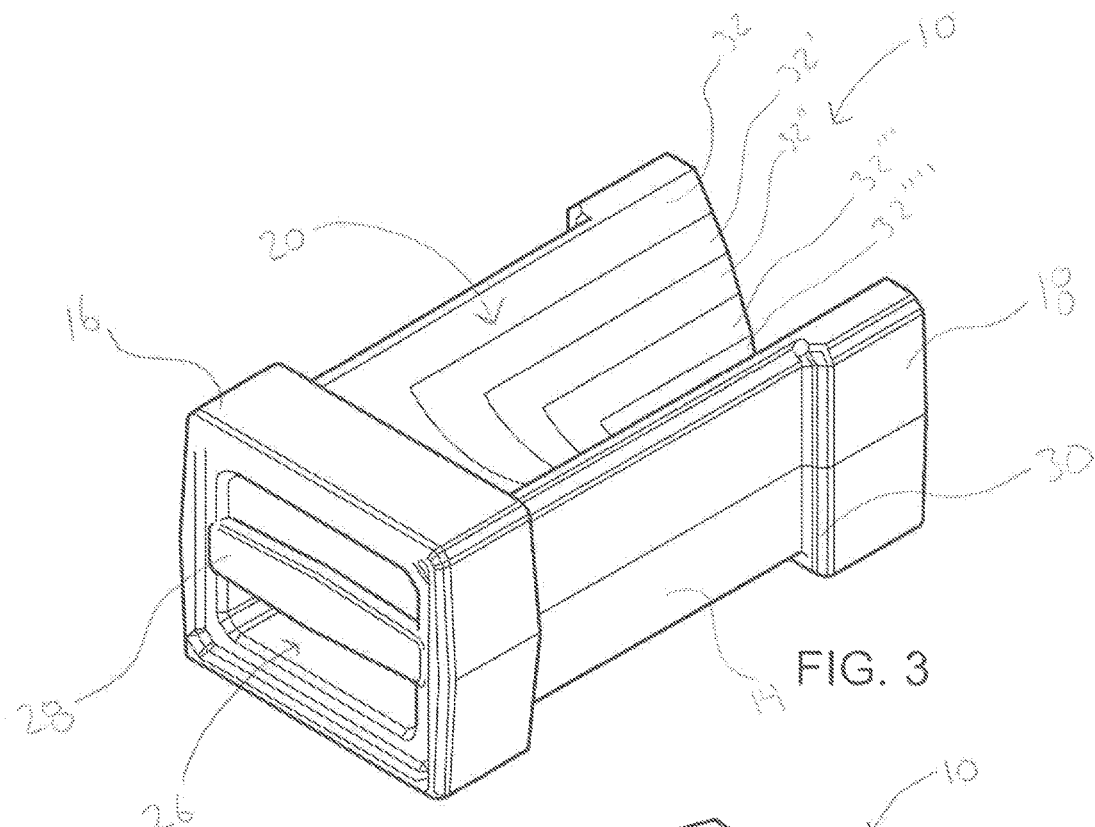
FIG. 3 is a top perspective view of the depth gauge and tube size identification tool.

The bottom portion 18 of the tool has a width greater than the width from the first opposed side portion 12 and the second opposed side portion 14. In other words, the bottom portion 18 extends outward from the first opposed side portion 12, the second opposed side portion 14, and the back portion 22, forming a ledge 30, and extends downwardly from the ledge 30 to a lower edge. The ledge 30 may be chamfered. The bottom portion 18 is composed of a first side, a second side, and a rear side, wherein an edge of the first side intersects an edge of the rear side and an edge of the second side intersects the opposite edge of the rear side. An end portion extends inwards towards the center of the bottom portion 18 from the lower edge. As shown in FIG. 2, the end portion is substantially v-shaped, which is composed of the outer edges of a plurality of curved elements (32, 32', 32", 32'", 32"", and 32""') within the open face 20.

The open face 20 defines the depth gauge and tube size identification section. This section allows a user to measure the outside diameter of a tube, such as a pipe. This section also allows a user to measure the proper depth the tube should be inserted into a fitting for secure, complete, and proper connection between the tube and a fitting. This single tool 10 allows a user to measure the proper depth a tube should be inserted into a fitting for a plurality of tubes. As illustrated, the tool 12 allows a user to measure the proper depth that six tubes containing various outside diameters should be inserted into a fitting by only using a single tool. Likewise, this tool 10 allows a user to measure the outside diameter of a plurality of tubes containing various outside diameters by only using a single tool. While the illustrated tool 10 allows for six tubes to be measured, the tool may be designed in accordance with this invention to only allow a single tube to be measured, wherein only a single curved element is contained within. Alternatively, a tool 10 in accordance with the present invention may allow at least one tube to be measured, two or more tubes to be measured, or a plurality of tubes to be measured using only a single tool 10 as described herein, wherein the tool 10 has at least one curved element, two or more curved elements, or a plurality of curved elements.

Figure 4:
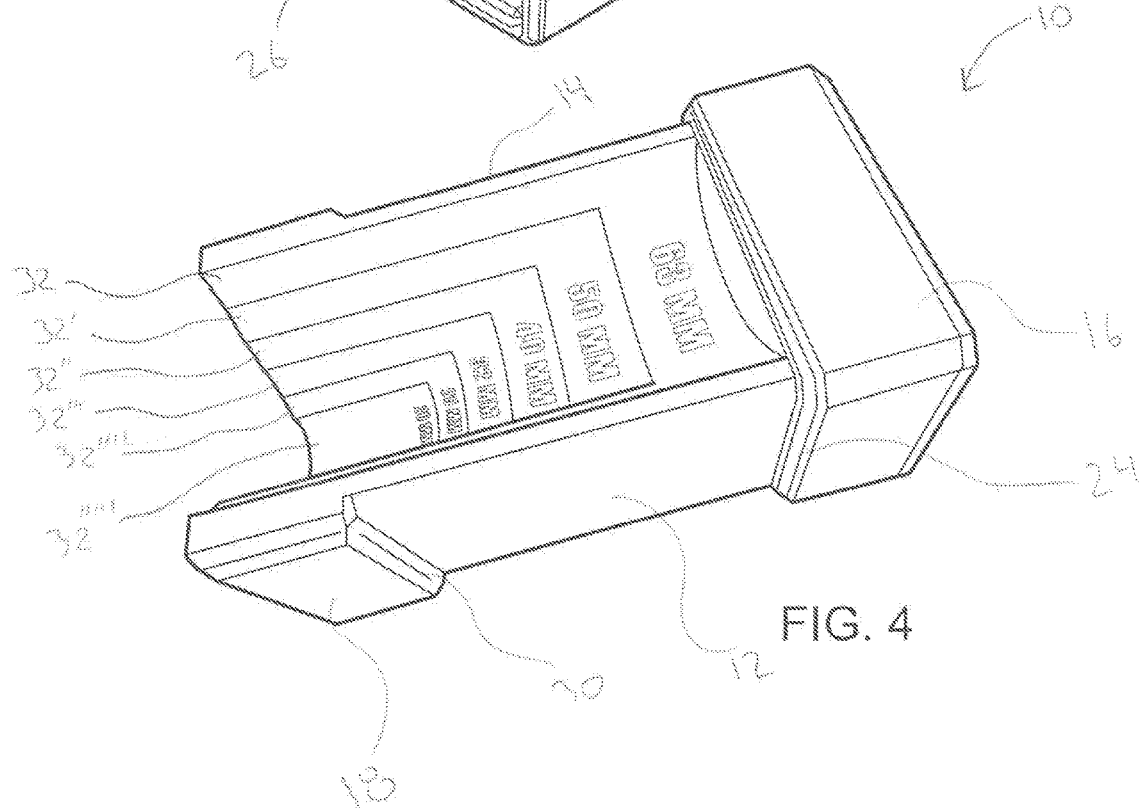
FIG. 4 is a top perspective view of the depth gauge and tube size identification tool.
Figure 5:
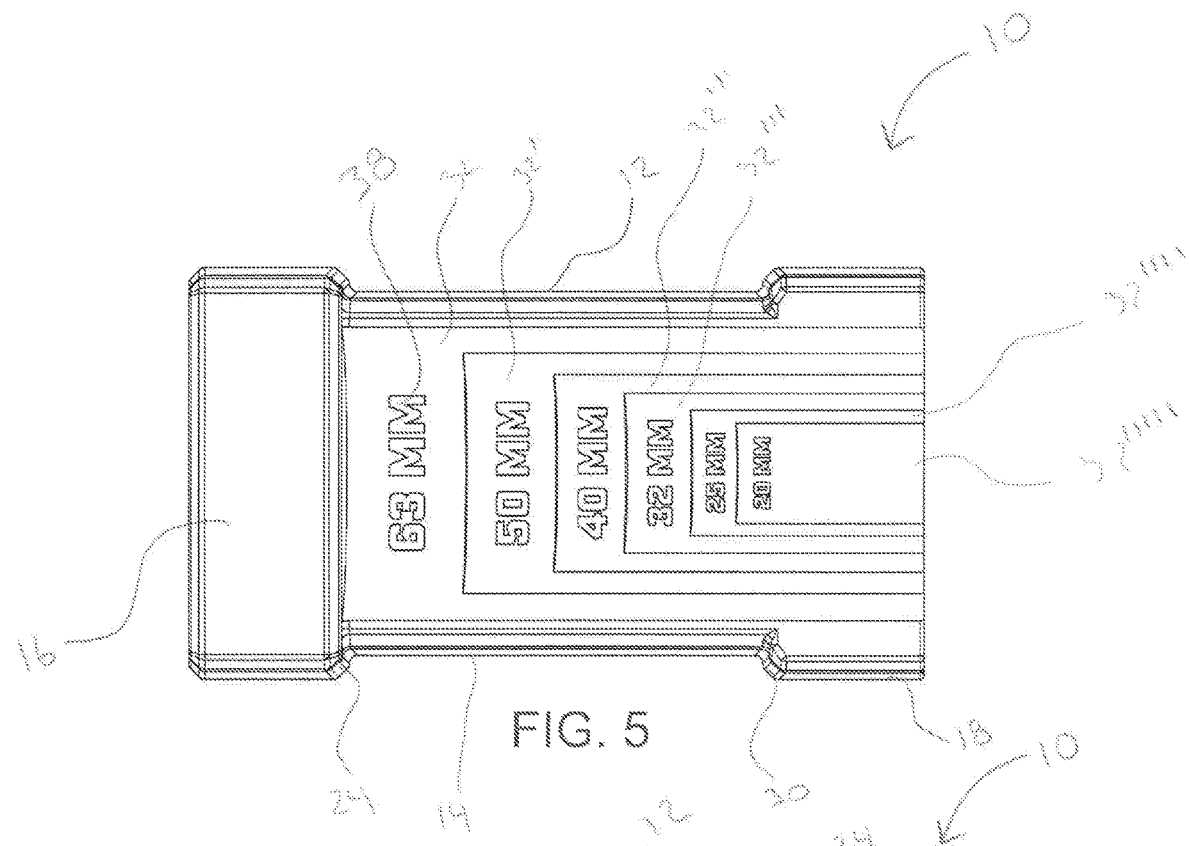
FIG. 5 is a top view of the depth gauge and tube size identification tool.

The open face 20 contains a plurality of curved elements (32, 32', 32", 32'", 32"", and 32""') for receiving a tube. As shown in FIGS. 1, 4, and 5, the first curved element 32 contains a curved face portion that contains a top edge, a bottom edge, a first side edge, and a second side edge, wherein the first side edge is adjacent the first opposed side portion 12 of the tool 10, and the second side edge is adjacent the second opposed side portion 14 of the tool 10. The curved elements (32, 32', 32", 32'", 32"", and 32""') have a convex shape, wherein each curved element (32, 32', 32", 32'", 32"", and 32""') is positioned within the open face 20 of the housing and below an upper edge of the first opposed side portion 12 and an upper edge of the second opposed side portion 14.

A first shoulder extends downwardly from a distal portion of the curved face portion of the first curved element 32 and a second shoulder extends downwardly from a distal portion of the curved face portion of the first curved element 32. The first shoulder and second shoulder each have an outer edge and an inner edge. The outer edge of the first shoulder is adjacent the first opposed side portion 12 of the tool 10, and the outer edge of the second shoulder is adjacent the second opposed side portion 14 of the tool 10. The first shoulder and the second shoulder of the first curved element 32 are parallel to each other and terminate at the end portion on the bottom portion 18. The first curved element 32 is generally u-shaped with the interior boundaries of the first curved element 32 defined by the bottom edge of the curved face portion, the inner edge of the first shoulder, and the inner edge of the second shoulder.

The curved face portion of the first curved element 32 has a predetermined radius of curvature identical to the radius of curvature of a tube intended to be inserted into the open face 20 of the tool 10. Likewise, the first shoulder and the second shoulder have the same radius of curvature, spanning from the outer edge to the inner edge, as the curved face portion of the first curved element 32 for receiving the exterior surface of a tube. The curved face portion of the first curved element 32 is adjacent the underside of the top portion 16, and specifically the top edge of the curved face portion of the first curved element 32 is adjacent the underside of the top portion 16. As the curved face portion of the first curved element 32 has a radius of curvature, the curved face portion, including its top edge, extends from the first opposed side portion 12 to the second opposed side portion 14. The top edge of the curved face portion of the first curved element 32 is adjacent the underside of the top portion 16, wherein a c-shaped or semi-circular portion of the underside of the top portion is exposed, serving as a stop for an end of a tube inserted into the first curved element 32. The stop prevents the end of the tube from moving deeper into the first curved element 32, but also assists in retaining the end of the tube in the first curved element 32 by friction fit.

A second curved element 32' is disposed within the area between the bottom edge of the curved face portion, inner edge of the first shoulder, and the inner edge of the second shoulder of the first curved element 32. As shown in FIGS. 1, 4, and 5, the second curved element 32' contains a curved face portion that contains a top edge, a bottom edge, a first side edge, and a second side edge, wherein the first side edge is adjacent the inner edge of the first shoulder of the first curved element 32, and the second side edge is adjacent the inner edge of the second shoulder of the first curved element 32. A first shoulder extends downwardly from a distal portion of the curved face portion of the second curved element 32' and a second shoulder extends downwardly from a distal portion of the curved face portion of the second curved element 32'. The first shoulder and the second shoulder each have an outer edge and an inner edge. The outer edge of the first shoulder is adjacent the inner edge of the first shoulder of the first curved element 32, and the outer edge of the second shoulder is adjacent the inner edge of the second shoulder of the first curved element 32. The first shoulder and the second shoulder of the second curved element 32' are parallel to each other and terminate at the end portion on the bottom portion 18. The second curved element 32' is generally u-shaped with the interior boundaries of the second curved element 32' defined by the bottom edge of the annular pace portion, the inner edge of the first shoulder, and the inner edge of the second shoulder.

The curved face portion of the second curved element 32' has a predetermined radius of curvature identical to the radius of curvature of a tube intended to be inserted into the open face 20 of the tool 10. Likewise, the first shoulder and the second shoulder have the same radius of curvature, spanning from the outer edge to the inner edge, as the curved face portion of the second curved element 32' for receiving the exterior surface of a tube. The top edge of the curved face portion of the second curved element is adjacent the bottom edge of the first curved element 32. A shelf 34 is formed between the bottom edge of the curved face portion of the first curved element 32 and the top edge of the curved face portion of the second curved element 32'. The shelf 34 is c-shaped and forms a stop for a tube that may be inserted into the second curved element 32'.

A third curved element 32" is disposed within the area between the bottom edge of the curved face portion, inner edge of the first shoulder, and the inner edge of the second shoulder of the second curved element 32'. As shown in FIGS. 1, 4, and 5, the third curved element 32" contains a curved face portion that contains a top edge, a bottom edge, a first side edge, and a second side edge, wherein the first side edge is adjacent the inner edge of the first shoulder of the second curved element 32', and the second side edge is adjacent the inner edge of the second shoulder of the second curved element 32'. A first shoulder extends downwardly from a distal portion of the curved face portion of the third curved element 32" and a second shoulder extends downwardly from a distal portion of the curved face portion of the third curved element 32". The first shoulder and the second shoulder each have an outer edge and an inner edge. The outer edge of the first shoulder is adjacent the inner edge of the first shoulder of the second curved element 32', and the outer edge of the second shoulder is adjacent the inner edge of the second shoulder of the second curved element 32'. The first shoulder and the second shoulder of the third curved element 32" are parallel to each other and terminate at the end portion on the bottom portion 18. The third curved element 32" is generally u-shaped with the interior boundaries of the third curved element 32" defined by the bottom edge of the curved face portion, the inner edge of the first shoulder, and the inner edge of the second shoulder.

The curved face portion of the third curved element 32" has a predetermined radius of curvature identical to the radius of curvature of a tube intended to be inserted into the open face 20 of the tool 10. Likewise, the first shoulder and the second shoulder have the same radius of curvature, spanning from the outer edge to the inner edge, as the curved face portion of the third curved element 32" for receiving the exterior surface of a tube. The top edge of the curved face portion of the third curved element 32" is adjacent the bottom edge of the second curved element 32'. A shelf 34" is formed between the bottom edge of the curved face portion of the second curved element 32' and the top edge of the curved face portion of the third curved element 32". The shelf 34' is c-shaped and forms a stop for a tube that may be inserted into the third curved element 32".

A fourth curved element 32'" is disposed within the area between the bottom edge of the curved face portion, inner edge of the first shoulder, and the inner edge of the second shoulder of the third curved element 32". As shown in FIGS. 1, 4, and 5, the fourth curved element 32'" contains a curved face portion that contains a top edge, a bottom edge, a first side edge, and a second side edge, wherein the first side edge is adjacent the inner edge of the first shoulder of the third curved element 32", and the second side edge is adjacent the inner edge of the second shoulder of the third curved element 32". A first shoulder extends downwardly from a distal portion of the curved face portion of the fourth curved element 32'" and a second shoulder extends downwardly from a distal portion of the curved face portion of the fourth curved element 32'". The first shoulder and the second shoulder each have an outer edge and an inner edge. The outer edge of the first shoulder is adjacent the inner edge of the first shoulder of the third curved element 32", and the outer edge of the second shoulder is adjacent the inner edge of the second shoulder of the third curved element 32". The first shoulder and the second shoulder of the fourth curved element 32'" are parallel to each other and terminate at the end portion on the bottom portion 18. The fourth curved element 32'" is generally u-shaped with the interior boundaries of the third curved element 32" defined by the bottom edge of the curved face portion, the inner edge of the first shoulder, and the inner edge of the second shoulder.

The curved face portion of the fourth curved element 32'" has a predetermined radius of curvature identical to the radius of curvature of a tube intended to be inserted into the open face 20 of the tool 10. Likewise, the first shoulder and the second shoulder have the same radius of curvature, spanning from the outer edge to the inner edge, as the curved face portion of the fourth curved element 32'" for receiving the exterior surface of a tube. The top edge of the curved face portion of the fourth curved element 32'" is adjacent the bottom edge of the third curved element 32". A shelf 34" is formed between the bottom edge of the curved face portion of the third curved element 32" and the top edge of the curved face portion of the fourth curved element 32'". The shelf 34" is c-shaped and forms a stop for a tube that may be inserted into the fourth curved element 32'".

A fifth curved element 32"" is disposed within the area between the bottom edge of the curved face portion, inner edge of the first shoulder, and the inner edge of the second shoulder of the fourth curved element 32'". As shown in FIGS. 1, 4, and 5, the fifth curved element 32"" contains a curved face portion that contains a top edge, a bottom edge, a first side edge, and a second side edge, wherein the first side edge is adjacent the inner edge of the first shoulder of the fourth curved element 32", and the second side edge is adjacent the inner edge of the second shoulder of the fourth curved element 32'". A first shoulder extends downwardly from a distal portion of the curved face portion of the fifth curved element 32"" and a second shoulder extends downwardly from a distal portion of the curved face portion of the fifth curved element 32"". The first shoulder and the second shoulder each have an outer edge and an inner edge. The outer edge of the first shoulder is adjacent the inner edge of the first shoulder of the fourth curved element 32", and the outer edge of the second shoulder is adjacent the inner edge of the second shoulder of the fourth curved element 32'". The first shoulder and the second shoulder of the fifth curved element 32"" are parallel to each other and terminate at the end portion on the bottom portion 18. The fifth curved element 32"" is generally u-shaped with the interior boundaries of the fifth curved element 32"" defined by the bottom edge of the curved face portion, the inner edge of the first shoulder, and the inner edge of the second shoulder.

The curved face portion of the fifth curved element 32"" has a predetermined radius of curvature identical to the radius of curvature of a tube intended to be inserted into the open face 20 of the tool 10. Likewise, the first shoulder and the second shoulder have the same radius of curvature, spanning from the outer edge to the inner edge, as the curved face portion of the fifth curved element 32"" for receiving the exterior surface of a tube. The top edge of the curved face portion of the fifth curved element 32"" is adjacent the bottom edge of the fourth curved element 32'". A shelf 34'" is formed between the bottom edge of the curved face portion of the fourth curved element 32'" and the top edge of the curved face portion of the fifth curved element 32"". The shelf 34'" is c-shaped and forms a stop for a tube that may be inserted into the fifth curved element 32"". The interior boundaries of the fifth curved element 32" " is defined by the bottom edge of the curved face portion, the inner edge of the first shoulder, and the inner edge of the second shoulder.

A sixth curved element 32""' is disposed within the area between the bottom edge of the curved face portion, inner edge of the first shoulder, and the inner edge of the second shoulder of the fifth curved element 32"". As shown in FIGS. 1, 4, and 5, the sixth curved element 32""' contains a curved face portion that contains a top edge, a bottom edge, a first side edge, and a second side edge, wherein the first side edge is adjacent the inner edge of the first shoulder of the fifth curved element 32"", and the second side edge is adjacent the inner edge of the second shoulder of the fifth curved element 32"". Unlike the first curved element 32, the second curved element 32', the third curved element 32", the fourth curved element 32", and the fifth curved element 32"", the sixth curved element 32""' does not contain a first shoulder and a second shoulder, instead, the curved face portion extends the entire width between the inner edge of the first shoulder of the fifth curved element 32" " and the inner edge of the second shoulder of the fifth curved element 32"" and is configured to receive the exterior surface of a tube having the predetermined outside diameter intended to be received within the sixth curved element 32""'.

The curved face portion of the sixth curved element 32""' has a predetermined radius of curvature identical to the radius of curvature of a tube intended to be inserted into the open face 20 of the tool 10. The top edge of the curved face portion of the sixth curved element 32""' is adjacent the bottom edge of the fifth curved element 32"". A shelf 34'" is formed between the bottom edge of the curved face portion of the fifth curved element 32"" and the top edge of the curved face portion of the sixth curved element 32""'. The shelf 34'" is c-shaped and forms a stop for a tube that may be inserted into the sixth curved element 32""'.

Figure 6:
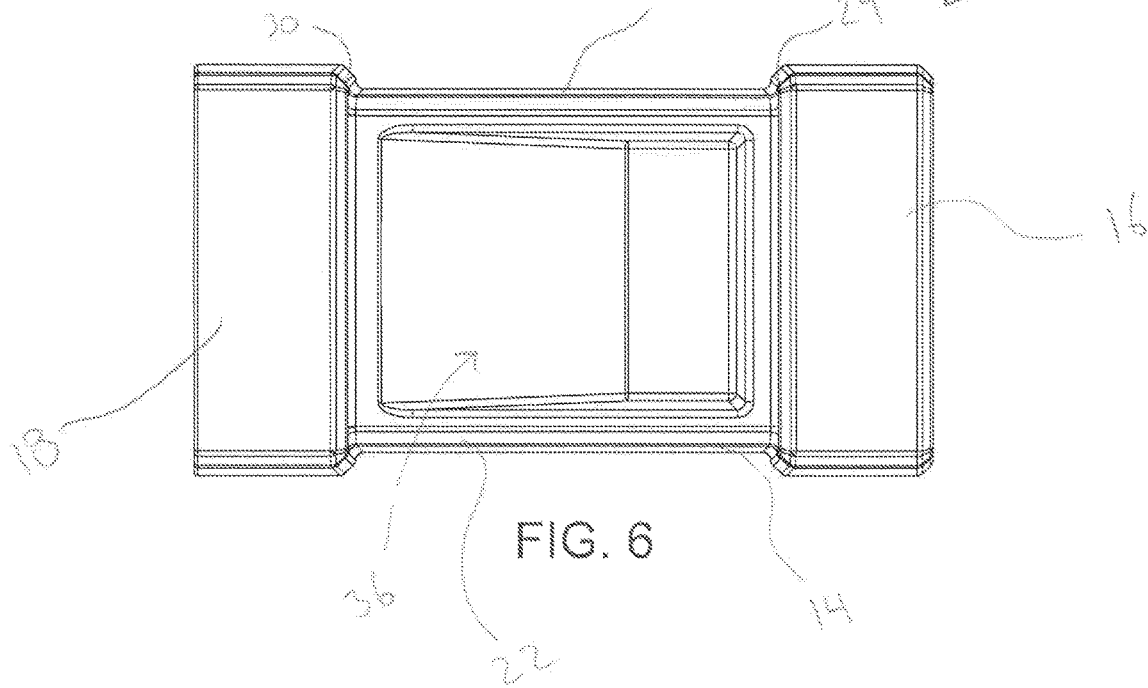
FIG. 6 is a bottom view of the depth gauge and tube size identification tool.
Figures 7, 8:
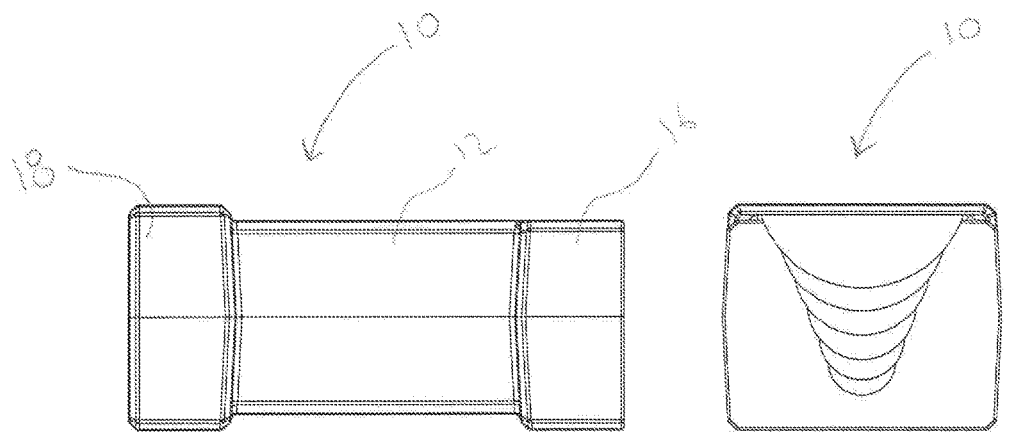
FIG. 7 is a side view of the depth gauge and tube size identification tool.
FIG. 8 is a cut-away view of the depth gauge and tube size identification tool.
Figures 9, 10:
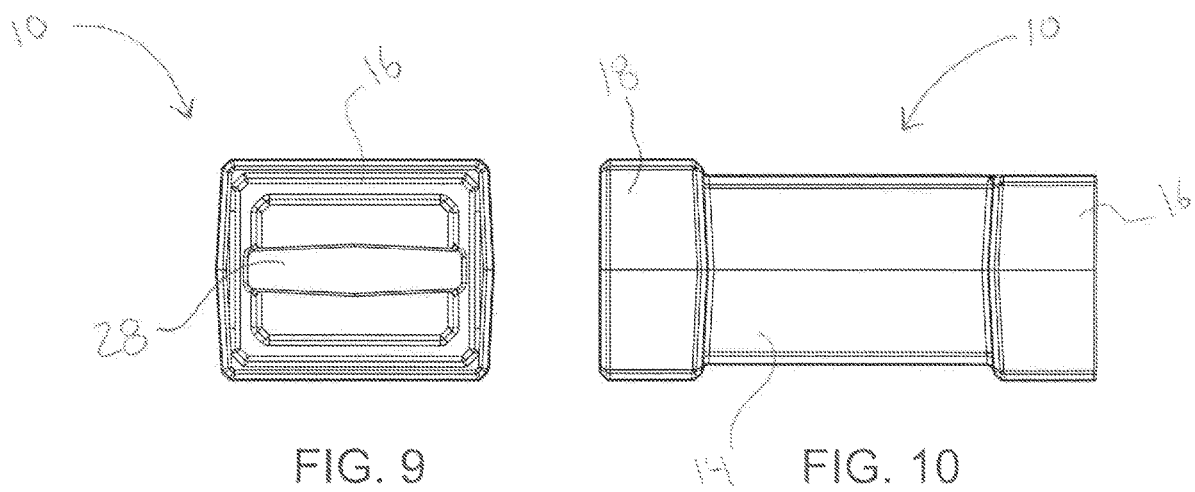
FIG. 9 is a view of the top portion of the depth gauge and tube size identification tool.
FIG. 10 is another side view of the depth gauge and tube size identification tool.

The back portion 22 contains a recess 36 disposed between the top portion 16 and the bottom portion 18. The recess 36 consists of four downwardly extending walls and a base portion. The walls extend downwardly from an upper surface of the back portion 22 to the base portion. In other words, the upper edge of each wall is adjacent the upper surface of the back portion 22 and the lower edge of each wall is adjacent an outer edge of the base portion. As illustrated in FIGS. 2 and 6, one of the downwardly extending walls extends downwardly at an angle to the base portion, which is the wall adjacent the bottom portion 18. This downwardly angled wall gradually extends at an angle from the upper surface of the back portion 22 to the base portion. The two downwardly extending walls adjacent thereto engage an edge of the downwardly angled wall, wherein an edge of these two adjacent walls are angled towards the base portion at the same angle as the downwardly angle wall extends with respect to the upper surface of the back portion 22 and the base portion. The oppose edge of these two adjacent walls extends downwards to the base portion at a substantially 90° angle with respect to the upper surface of the back portion 22 and the base portion. Likewise, the face of three of the downwardly extending walls, with the exception of the face of the downwardly angled wall, extend downwards to the base portion at a substantially 90° angle with respect to the upper surface of the back portion 22 and the base portion. The recess 36 within the back portion 22 allows a user to grip and hold the tool 10 easily and firmly during operation.

Indicia 38 may be within each curved element displaying the outside diameter of the tube that has the same radius of curvature of the respective curved element. The indicia 38 may be in the form of text, symbols, and/or colors. The text, symbols, and/or colors may be molded, imprinted, and/or marked on the surface of each curved element. As shown in FIGS. 1, 4, and 5, the indicia 38 comprises text indicating the outside diameter of the tube that appropriately fits within each respective curved element (32, 32', 32", 32'", 32"", and 32""'). As shown in the figures, the indicia 38 is text identifying the tube having a radius of curvature that corresponds with the radius of curvature for each curved element (32, 32', 32", 32'", 32"", and 32""'). By example only, the indicia 38 indicates tubes between 20 mm to 63 mm sizes on a single tool 10. These sizes are for example only and any sized tube or indicia 38 may be utilized to identify the tube that corresponds to the respective curved element (32, 32', 32", 32'", 32"", and 32""'). In another embodiment, a symbol could be included within each curved element, the first shoulder, or the second shoulder, serving as the depth gauge, or any other relevant measurement to the user. In yet another embodiment, one or more curved elements, first shoulders, and second shoulders can be color coded (e.g. red, blue, orange, yellow, green, etc.), that corresponds to a markings or similar indicia on a tube, assisting in identifying the size of the tube.

The end portion of the bottom portion 18 contains a v-shaped opening that corresponds with the bottom edge of the sixth curved element 32", meaning the bottom portion of the v-shaped opening is defined by and begins at the bottom edge of the sixth curved element 32". Each side of the v-shaped opening extends outwardly and upwardly, wherein the edges of the opening are defined by the bottom edge of the first shoulder and the second shoulder of each curved element (32, 32', 32", 32''', 32'''', and 32''''').

During use, a user may insert an end of a tube into the first curved element 32 with the exterior surface of the tube in contact with the curved face portion, the first shoulder, and the second shoulder. The end of the tube is placed flush with the underside of the top portion 16 and if the radius of curvature of the curved face portion corresponds with the radius of curvature of the tube, the tube has been placed in the correct curved element. The tube extends thorough the v-shaped opening in the bottom portion 18. Thereafter, the user knows the size of the tube because the indicia 38 shows the size of the tube. The user also knows the depth to place the tube within a fitting, which is indicated and corresponds to the portion of the tube that is adjacent the end portion of the bottom portion 18. The user may use a marking device, such as a pen, chalk, or the like, to mark this depth measurement. Likewise, a user may insert an end of the tube into a curved element (32, 32', 32", 32''', 32'''', and 32'''''), and if the first curved element (32, 32', 32", 32''', 32'''', and 32''''') the tube is inserted is not a match, the user can move the tube to an adjacent curved element (32, 32', 32", 32''', 32'''', and 32''''') above or below the curved element (32, 32', 32", 32''', 32'''', and 32''''') that was not a match. This process occurs until the user correctly matches the tube with the curved element (32, 32', 32", 32''', 32'''', and 32'''''). The tube extends thorough the v-shaped opening in the bottom portion 18. When the user inserts the tube in the second curved element 32', the third curved element 32", the fourth curved element 32''', the fifth curved element 32'''', or the sixth curved element 32', an end of the tube is placed flush with the shelf (34, 34', 34", or 34''') and if the radius of curvature of the curved face portion corresponds with the radius of curvature of the tube, the tube has been placed in the correct curved element. Thereafter, the user knows the size of the tube because the indicia 38 shows the size of the tube. The user also knows the depth to place the tube within a fitting, which is indicated and corresponds to the portion of the tube that is adjacent the end portion of the bottom portion 18. The user may use a marking device, such as a pen, chalk, or the like, to mark this depth measurement.

The tool 10 can be composed of any material, allowing a user to accurately measure the outside diameter of a tube, such as a pipe, and measure and identify the depth for correctly inserting the tube into a fitting for a secure, complete, and proper connection. Such materials may include, but not limited to, plastic, such as ABS plastic, rubber, or a metal, such as Aluminum.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. The depth gauge and tube size identification tool, comprising:
    a housing that includes a first opposed side portion, a second opposed side portion, a top portion, and a bottom portion;
    an open face disposed within the housing and positioned between the first opposed side portion, the second opposed side portion, and the top portion;
    two or more curved elements disposed within the open face having a curved face portion with a radius of curvature that corresponds with the outside diameter of a tube intended to be inserted into the at least one curved element for identifying the tube size; and
    at least one of the curved elements contains a curved face portion and a first shoulder extends from a distal portion of the curved face portion and a second shoulder extends from another distal portion of the curved face portion, the curved face portion, the first shoulder, and the second shoulder contain a radius of curvature that corresponds with the outside diameter of a tube intended to be inserted into the at least one curved element for identifying the tube size.

2. The depth gauge and tube size identification tool according to claim 1, wherein the bottom portion includes an end portion that serves as a depth gauge for the tube inserted therein.

3. The depth gauge and tube size identification tool according to claim 1, wherein each curved element is disposed in a consecutive arrangement where the curved element with the largest radius of curvature is positioned adjacent a top portion of the housing and each successive curved element is positioned within an interior area of the curved element arranged by a decreasing radius of curvature.

4. The depth gauge and tube size identification tool according to claim 1, wherein the tool is composed of plastic.

5. The depth gauge and tube size identification tool according to claim 1, further comprising a handle.

6. A method of gauging the depth and identifying the size of a tube, comprising:
    providing a housing including an open face, and at least one curved element disposed within the open face having a curved face portion with a predetermined radius of curvature; and
    placing a tube within the at least one curved element for identifying the size of the tube that corresponds to the radius of the at least one curved element.

7. The method of gauging the depth and identifying the size of a tube according to claim 6, wherein the housing further comprises a first opposed side portion and a second opposed side portion and the open face disposed therebetween.

8. The method of gauging the depth and identifying the size of a tube according to claim 6, wherein the housing further comprises a top portion, a first opposed side portion, a second opposed side portion, and a bottom portion, and the open face disposed therebetween.

9. The method of gauging the depth and identifying the size of a tube according to claim 8, wherein the bottom portion includes an end portion on the bottom portion that serves as a depth gauge for the tube inserted therein.

10. The method of gauging the depth and identifying the size of a tube according to claim 6, further comprising two or more curved elements disposed within the open face having a curved face portion with a radius of curvature that corresponds with the outside diameter of a tube intended to be inserted into the at least one curved element for identifying the tube size.

11. The method of gauging the depth and identifying the size of a tube according to claim 6, wherein the tool is composed of plastic.

12. The method of gauging the depth and identifying the size of a tube according to claim 6, further comprising a handle.

* * * * *